United States Patent Office 2,734,082
Patented Feb. 7, 1956

2,734,082

N-2-ETHYLCROTONYL-N'-METHYLOL UREA

Otis E. Faucher, Elkhart, Ind., assignor to Miles Laboratories, Inc., Elkhart, Ind., a corporation of Indiana No Drawing. Application November 27, 1953,
Serial No. 394,890

1 Claim. (Cl. 260—553)

This invention relates to methylol derivatives of acylureas and more particularly relates to the production of methylolureides by the reaction of formaldehyde with an acylurea.

The compounds contemplated by this invention can be generally described by the empirical formula

RCONHCONHCH₂OH as produced by the reaction represented by

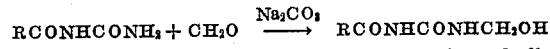
$$RCONHCONH_2 + CH_2O \xrightarrow{Na_2CO_3} RCONHCONHCH_2OH$$

In these formulae R has its usual connotation of alkyl or alkenyl with the RCO— portion representing any organic acid residue.

Compounds of this invention possess sedative and hypnotic physiological activity and, because of their relatively greater solubility in either water or organic solvents, are more adaptable than the parent ureides from which they are derived.

As a specific example, the following detailed descriptions indicate the operative steps of the method employed to produce N-2-ethylcrotonyl-N'-methylolurea from the higher-melting isomer of 2-ethylcrotonylurea. One suitable method for the preparation of this starting material is described in Example I.

*Example I*

54 g. of carbromal (α-bromo-α-ethylbutyrylurea) in 600 cc. of isopropanol is stirred and refluxed for three hours with 27.8 g. of anhydrous silver oxide. The reaction mixture is filtered and the silver residue is extracted with 100 cc. of boiling isopropanol. The filtered and dried solids which separate plus additional product from concentration of the filtrate can be obtained by recrystallization in pure form as white needles of 2-ethylcrotonylurea having a melting point of 191–193° C.

*Example II*

25 g. of 2-ethylcrotonylurea, the higher-melting isomer melting at 191–193° C. prepared according to the method of Example I, 1 g. of sodium carbonate, 35 cc. of formalin and 800 cc. of water were let reflux for 16 hours. On cooling a crystalline solid separated. This, after filtration and drying, weighed 9 g. and was largely unchanged starting material. The filtrate was concentrated to 300 cc. under reduced pressure and chilled. The crystalline solid which separated was filtered and the filtrate was further concentrated to 100 cc. to yield another crop of crystals. The combined second and third crops of crystals, 15 g., were recrystallized first from water and then from 95% alcohol. The crystals after drying started to shrink at 124–126° and fused with elimination of a gas at 165–175°. Perecent of nitrogen found 15.13; calculated for $C_8H_{14}N_2O_3$ 15.05%.

By controlling the pH of the reaction medium in the neutral and alkaline range I have produced novel nonresinous methylol derivatives of acylureas.

What I claim as my invention is:

N-2-ethylcrotonyl-N'-methylolurea.

References Cited in the file of this patent

UNITED STATES PATENTS

| | | |
|---|---|---|
| 2,321,544 | Dittmar et al. | June 8, 1943 |
| 2,342,785 | Bock et al. | Feb. 29, 1944 |